(12) United States Patent
Matsuda et al.

(10) Patent No.: US 9,052,827 B1
(45) Date of Patent: Jun. 9, 2015

(54) STORAGE APPARATUS AND DATA MANAGEMENT METHOD

(71) Applicant: Hitachi, Ltd., Tokyo (JP)

(72) Inventors: Ken Matsuda, Tokyo (JP); Yutaka Tanaka, Tokyo (JP); Masamitsu Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/347,085

(22) PCT Filed: Jan. 11, 2013

(86) PCT No.: PCT/JP2013/050372
§ 371 (c)(1),
(2) Date: Mar. 25, 2014

(87) PCT Pub. No.: WO2014/109045
PCT Pub. Date: Jul. 17, 2014

(51) Int. Cl.
*G06F 12/00* (2006.01)
*G06F 3/06* (2006.01)

(52) U.S. Cl.
CPC ............ *G06F 3/0619* (2013.01); *G06F 3/0689* (2013.01); *G06F 3/0665* (2013.01)

(58) Field of Classification Search
None
See application file for complete search history.

(56) References Cited

U.S. PATENT DOCUMENTS

| | | | |
|---|---|---|---|
| 2008/0263190 A1 | 10/2008 | Serizawa et al. | |
| 2011/0145532 A1 | 6/2011 | Deguchi et al. | |
| 2011/0167232 A1 | 7/2011 | Takada et al. | |
| 2012/0311602 A1 | 12/2012 | Deguchi et al. | |

FOREIGN PATENT DOCUMENTS

| | | | |
|---|---|---|---|
| JP | 2002-091807 A | 3/2002 | |
| JP | 2008-269424 A | 11/2008 | |
| JP | 2012-514776 A | 6/2012 | |
| JP | 2012-514778 A | 6/2012 | |
| WO | 2010/137071 A1 | 12/2010 | |
| WO | 2012/164633 A1 | 12/2012 | |

*Primary Examiner* — Kevin Verbrugge
(74) *Attorney, Agent, or Firm* — Volpe and Koenig, P.C.

(57) ABSTRACT

A storage apparatus includes: a plurality of microprocessors; a plurality of storage areas formed into a drive group constituted from a plurality of physical drives; and a control unit for managing one of the microprocessors, which takes charge of data input to and output from one or more storage areas of the plurality of storage areas, as a microprocessor having ownership of the one or more storage areas; wherein the microprocessor executes dump processing for having an external physical drive store data of the one or more storage areas, for which the microprocessor takes charge of the data input and output, in response to a received I/O request; and wherein the control unit transfers the ownership of the microprocessor according to processing load bias of the dump processing which the plurality of microprocessors take charge of.

11 Claims, 17 Drawing Sheets

FIG.4

LDEV MANAGEMENT TABLE

| LDEV# | AUTOMATIC TRANSFER | MPPK # | PAIR SETTING | DUMP PROCESSING | |
|---|---|---|---|---|---|
| | | | | IN-PROCESSING STATUS | START TIME |
| 10 | ON | 0 | FC SECONDARY | UNPROCESSED | – |
| 11 | ON | 0 | FC SECONDARY | IN PROCESSING | 2:10 |
| 1211A | 1211B | 1211C | 1211D | 1211E | 1211F |

COMMAND PROCESSING MANAGEMENT TABLE

| LDEV# | IMMEDIATELY PRECEDING COMMAND TYPE | IMMEDIATELY PRECEDING PROCESSING COMPLETION TIME (HOUR; MINUTE; SECOND; ms) | TYPE OF COMMAND TWO COMMANDS BEFORE CURRENT ONE | PROCESSING COMPLETION TIME FOR COMMAND TWO COMMANDS BEFORE CURRENT ONE (HOUR; MINUTE; SECOND; ms) |
|---|---|---|---|---|
| 00 | RDTRK | 10:00:00,021 | RDTRK | 10:00:00,001 |
| 01 | WRD | 10:00:01,000 | RDCKD | 10:00:00,011 |
| 02 | RDTRK | 10:00:02,000 | RDTRK | 10:00:00,021 |
| 03 | ... | ... | ... | ... |

MPPK MANAGEMENT TABLE

| MPPK # | AUTOMATIC TRANSFER | NUMBER OF VOLUMES | | | RESOURCES | PP STATUS | AVERAGE RESPONSE TIME | TRANSFER LIMITATION |
| | | DUMP PROCESSING | TRANSACTION PROCESSING | OTHERS | MP OPERATING RATIO | LOCAL COPY | | |
|---|---|---|---|---|---|---|---|---|
| 0 | On | 3 | 7 | 10 | 70 | FC | 100us | NONE |
| 1 | On | 1 | 9 | 10 | 50 | FC | 60us | NONE |
| 2 | On | 0 | 5 | 15 | 10 | SI | 20us | NONE |
| 3 | On | 0 | 15 | 5 | 20 | NONE | 50us | NONE |
| 1213A | 1213B | 1213C | 1213D | 1213E | 1213F | 1213G | 1213H | 1213I |

| PAIR NUMBER | VOL# | VOL# OF PAIRED VOLUME | BEGINING OF EXTENT OF PAIR | END OF EXTENT OF PAIR | LAST RDTRK POSITION |
|---|---|---|---|---|---|
| 0 | 0010 | 0020 | 1cyl | 3000cyl | 800cyl |
| 1 | 0010 | 0020 | 3001cyl | 6000cyl | 5500cyl |
| 2 | NO PAIR | ... | ... | ... | ... |
| 1214A | 1214B | 1214C | 1214D | 1214E | 1214F |

SYSTEM SETTING TABLE

| # | TRANSFER STANDARD PRIORITY | ADDITIONAL PARAMETER | SUPPLEMENT |
|---|---|---|---|
| 1 | NUMBER OF DUMP JOB VOLUMES | xx | EQUALIZE THE NUMBER OF VOLUMES PER MPPK (DEFAULT) |
| 2 | MP OPERATING RATIO | yy | ADD MP OPERATING RATIO TO TRANSFER PRIORITY IN ADDITION TO #1 |
| 3 | AVERAGE RESPONSE TIME | zz | ADD AVERAGE RESPONSE TIME TO TRANSFER PRIORITY IN ADDITION TO #1 |

MANAGEMENT SCREEN

LDEV MANAGEMENT SCREEN

| LDEV# | MPPK# | AUTOMATIC TRANSFER |
|---|---|---|
| 0000 | 0 | ☑ On |
| 0001 | 1 | ☑ On |
| 0002 | 0 | ☐ Off |
| 0003 | 2 | ☐ OFf |

[APPLY] [ABORT]

FIG.13B

MANAGEMENT SCREEN

MPPK MANAGEMENT SCREEN

| MPPK# | AUTOMATIC TRANSFER | TRANSFER LIMITATION |
|---|---|---|
| 0 | ☑ On | NONE |
| 1 | ☑ On | PROHIBIT DUMP |
| 2 | ☑ On | PRIORITIZE DUMP |
| 3 | ☐ Off | NONE |

[APPLY] [ABORT]

FIG.13C

MANAGEMENT SCREEN

SYSTEM SETTING SCREEN

PRIORITY ORDER

| 1 | NUMBER OF DUMP JOBS |
| 2 | MP OPERATING RATIO ▼ |
| 3 | AVERAGE RESPONSE ▼ |

[APPLY] [ABORT]

STORAGE APPARATUS AND DATA MANAGEMENT METHOD

TECHNICAL FIELD

The present invention relates to a storage apparatus and data management method and is suited for use in a storage apparatus and data management method for executing data input/output processing by using a plurality of microprocessors.

BACKGROUND ART

Recently, various organizations including the government, companies, and universities deal with a large amount of various data, so that the data are managed by using a comparatively large-scale storage apparatus(es). Such a large-scale storage apparatus is constructed by arranging a plurality of storage devices (for example, hard disk drives) in an array. For example, one or more hard disk drives constitute one RAID (Redundant Arrays of Independent Disks) group and one or more logical groups are defined in physical storage areas provided by one RAID group. Then, these logical volumes are provided to a host system. The host system can write or read data by sending a specified command to the logical volume(s).

Since the above-described storage apparatus processes a large amount of various data, it is required to have high performance. So, in order to achieve high performance of the storage apparatus, a microprocessor package (hereinafter referred to as the MPPK) which takes charge of data processing such as data writing to and reading from the logical volumes is decided in advance and control information required for data processing is stored in a local memory in the MPPK. Under this circumstance, an MPPK which takes charge of processing of a certain logical volume is called an owner MPPK and this MPPK will be hereinafter referred to and explained as having ownership of the relevant logical volume.

Furthermore, Patent Literature 1 discloses a technique to relocate the ownership of a certain logical volume to another MPPK according to a resource status and response performance of the storage apparatus and distribute processing load on MPPK's.

CITATION LIST

Patent Literature

[Patent Literature 1] International Publication No. WO2012/164633

SUMMARY OF INVENTION

Problems to be Solved by the Invention

However, Patent Literature 1 mentioned above does not relocate the ownership in consideration of an I/O pattern and I/O multiplicity from a host system. So, this results in a problem of possible concentration of high-load inputs/outputs on an MPPK to which the ownership is relocated. For example, since dump processing which is intended to take in data transfers a larger amount of data at once as compared to normal transaction processing, it has a tendency to have a high load on the MPPK. Also, the dump processing is executed on random volumes with a plurality of multiplicities. Accordingly, when dump jobs are executed intensively on a certain MPPK, there is a possibility that an operating ratio of the MPPK may increase and its performance may degrade with respect to normal transaction processing other than the dump jobs.

The present invention was devised in light of the above-described circumstances and aims at suggesting a storage apparatus and data management method capable of relocating the ownership of an MPPK according to an I/O pattern and I/O multiplicity.

Means for Solving the Problems

In order to solve the problems described above, provided according to the present invention is a storage apparatus including: a plurality of microprocessors; a plurality of storage areas formed into a drive group constituted from a plurality of physical drives; and a control unit for managing one of the microprocessors, which takes charge of data input to and output from one or more storage areas of the plurality of storage areas, as a microprocessor having ownership of the one or more storage areas; wherein the microprocessor executes dump processing for having an external physical drive store data of the one or more storage areas, for which the microprocessor takes charge of the data input and output, in response to a received I/O request; and wherein the control unit transfers the ownership of the microprocessor according to processing load bias of the dump processing which the plurality of microprocessors take charge of.

According to the above-described configuration, the plurality of microprocessors execute dump processing in response to the received I/O request for the plurality of storage areas (logical volume), which are formed in a drive group constituted from the plurality of physical drives, and transfer ownership of a microprocessor in accordance with the processing load bias of the dump processing which the plurality of microprocessors take charge of. As a result, the processing performance of the entire storage apparatus can be enhanced by relocating the ownership of an MPPK according to multiplicity of the dump processing.

Advantageous Effects of Invention

According to the present invention, the processing performance of the entire storage apparatus can be enhanced by relocating the ownership of an MPPK according to an I/O pattern and I/O multiplicity.

BRIEF DESCRIPTION OF DRAWINGS

FIG. 4 is a chart indicating the content of an LDEV management table according to the embodiment.
FIG. 5 is a chart indicating the content of a command processing management table according to the embodiment.
FIG. 6 is a chart indicating the content of an MPPK management table according to the embodiment.
FIG. 7 is a chart indicating the content of a copy management table according to the embodiment.
FIG. 8 is a chart indicating the content of a system setting table according to the embodiment.

FIG. 13A is an example of an LDEV management screen according to the embodiment.

FIG. 13B is an example of an MPPK management screen according to the embodiment.

FIG. 13C is an example of a system setting screen according to the embodiment.

DESCRIPTION OF EMBODIMENTS

An embodiment of the present invention will be explained below in detail with reference to the attached drawings.

(1) Outlines of this Embodiment

Firstly, the outlines of this embodiment will be explained. In this embodiment, one MPPK is decided in advance to take charge of data processing such as writing data to, and reading data from, a logical volume as described above. To have one MPPK take charge of a certain logical volume is called ownership.

Figure 1:
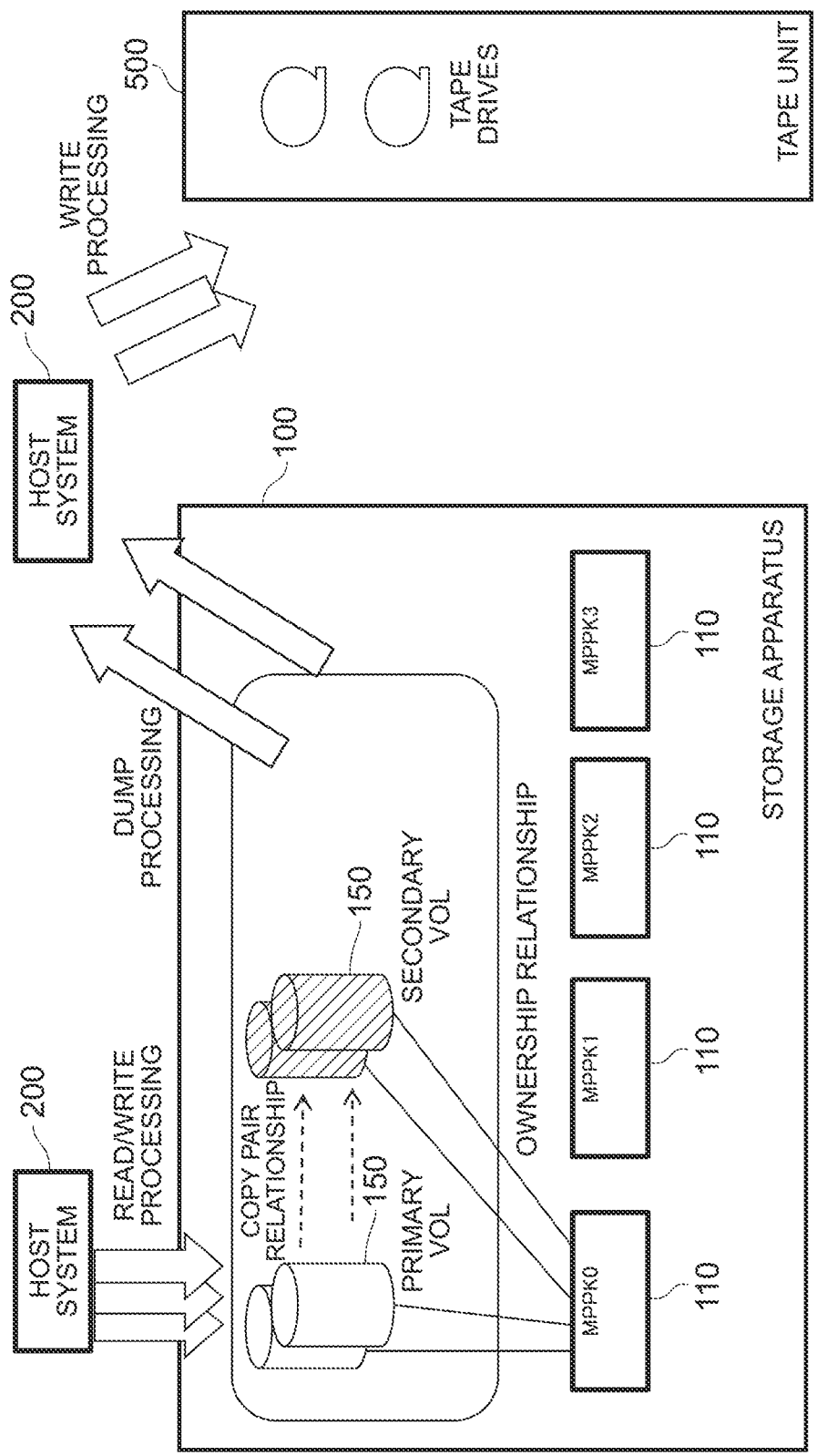
FIG. 1 is a conceptual diagram for explaining the outlines of an embodiment of the present invention.

For example, data inputs/outputs from a host system 200 include inputs/outputs for normal transaction processing and inputs/outputs for dump processing intended to take in data of secondary volumes. The dump processing is processing for taking in data of a secondary volume in a copy pair relationship with a primary volume and writing the data to, for example, a tape drive in a tape unit 500 as depicted in FIG. 1. Since a larger amount of data is transferred for inputs/outputs for this dump processing than for normal transaction inputs/outputs, an MPPK having ownership of a target volume of the dump processing tends to have a high processing load. Also, this dump processing is executed in multiplicity on a plurality of random secondary volumes. Therefore, when the dump processing is executed intensively on some of MPPK's, there is a possibility that degradation of performance for normal inputs/outputs other than dump jobs might be caused.

Furthermore, conventionally, the ownership of a certain logical volume is relocated to another MPPK according to a resource status in a storage apparatus and response performance, thereby distributing processing load on MPPK's. However, since a plurality of secondary volumes are selected at the same time and randomly during the dump processing as described above, the arrangement of ownership cannot be distributed in the storage apparatus 100 in advance and copy processing associated with the dump processing is executed intensively on some MPPK, which sometimes causes an increase of a processor's operating ratio and influences normal I/O processing.

So, in this embodiment, an I/O pattern for each volume is observed and whether the I/O pattern represents normal transaction processing or the dump processing is judged; and if the ownership of the dump processing is concentrated on some MPPK, the ownership is relocated properly by transferring that ownership to another MPPK and, therefore, performance of the entire storage apparatus can be enhanced.

(2) Hardware Configuration of Computer System

Figure 2:
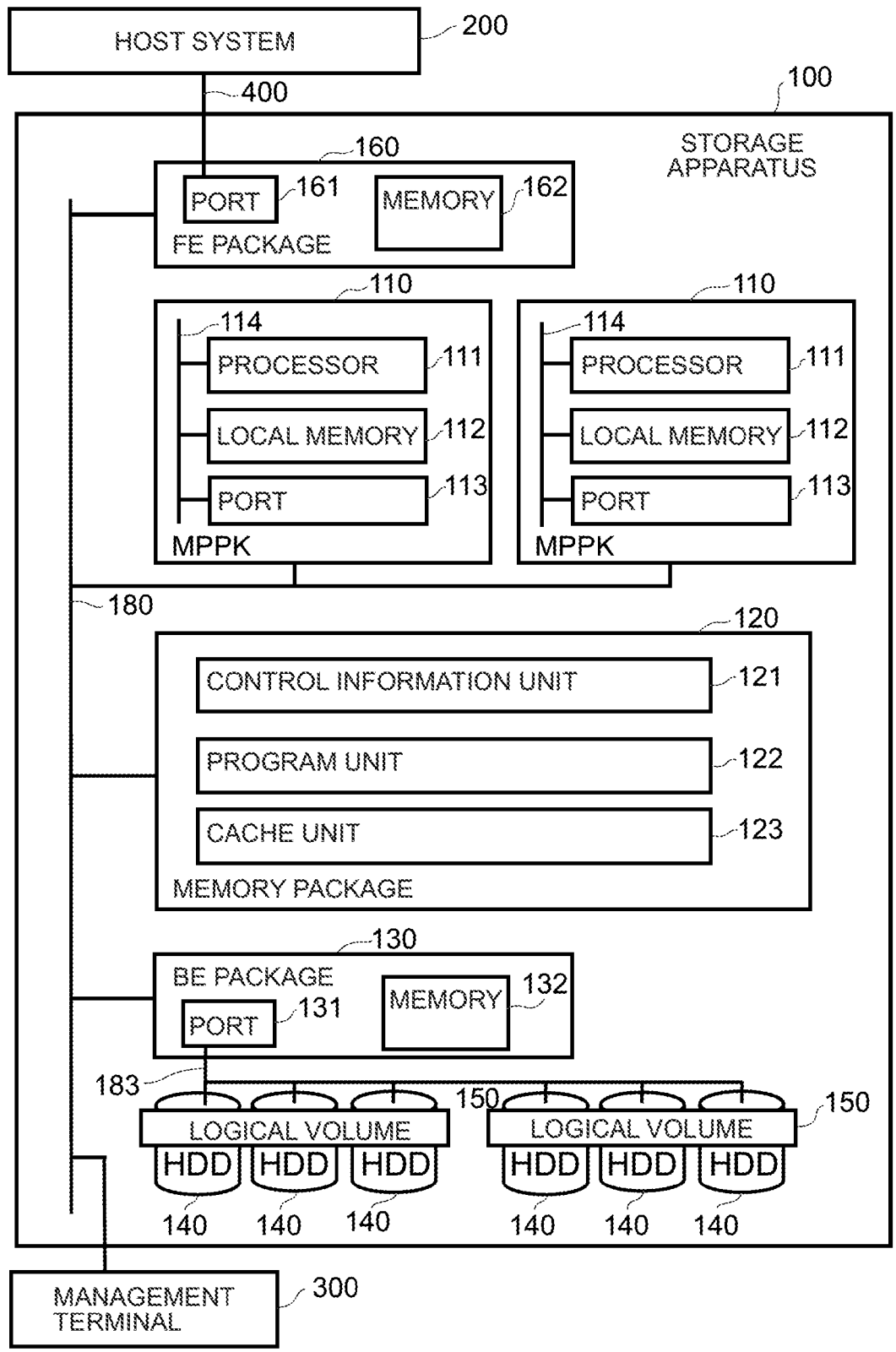
FIG. 2 is a block diagram illustrating a hardware configuration of a computer system according to the embodiment.

Next, a hardware configuration of a computer system 1 will be explained. As depicted in FIG. 2, the computer system 1 includes a storage apparatus 100, a host system 200, and a management terminal 300.

The storage apparatus 100 includes a front-end package (indicated as FE package in the drawing) 160, MPPK's (indicated as MPPK in the drawing) 110, a memory package 120, a back-end package (indicated as BE package in the drawing) 130, and hard disk drives (indicated as HDD [Hard Disk Drive] in the drawing) 140. Then, these internal devices are mutually connected via a network 180. Incidentally, the storage apparatus 100 may include a plurality of front-end packages 160, MPPK's 110, memory packages 120, back-end packages 130, and hard disk drives 140.

The front-end package 160 includes a port 161 and a memory 162. The port 161 is coupled to a port (not shown) of the host system 200 and receives a write request or a read request from the host system 200 via the port of the host system 200. Incidentally, the port of the host system 200 and the port 161 may be directly connected or indirectly connected by using a switch or the like. Furthermore, the memory 162 temporarily stores information about an MPPK (owner MPPK), which processes the read request or write request received from the host system 200, and data transferred from the host system 200 and data to be transferred to the host system 200. Incidentally, the front-end package 160 may include one or more ports 161 and memories 162.

The MPPK 110 includes a processor 111, a local memory 112, and a maintenance port 113. Then, these internal devices are mutually connected via a network 114. Incidentally, one MPPK 110 may include a plurality of processors 111, local memories 112, and maintenance ports 113.

The processor 111 executes, for example, write processing and read processing requested from the host system 200 by reading programs stored in a program unit 122 for the memory package 120 and executing them. The local memory 112 temporarily stores data of programs used by the processor 111 and also store various data including control information, business data, and programs which are stored in the hard disk drives 140 and the memory package 120. Incidentally, since the distance between the local memory 112 and the processor 111 is shorter than the distance between the local memory 12 and the memory package 120 or the hard disk drives 140, the processor 111 accesses the local memory 112 at high speeds.

The port 113 connects to the management terminal 300 via the network 180 and has a function that sends operation information of the MPPK 110 to the management terminal 300 and receives operations from the management terminal 300.

The memory package 120 includes, for example, a control information unit 121, a program unit 122, and a cache unit 123. The program unit 122 stores programs for implementing processing executed by the storage apparatus 100. Then, the control information unit 121 stores control information used by the programs stored in the program unit 122. The programs stored in the memory package 120 and the control information used by programs are read by the processor 111 for the MPPK 10 to execute processing.

The cache unit 123 temporarily stores data which are stored in the hard disk drives 140. The memory package 120 is a high-speed storage medium as compared to the hard disk drives 140. Therefore, for example, data used with a high frequency among data stored in the hard disk drives 140 are stored in the cache unit 123. So, as compared to a case where all pieces of data are always stored in the hard disk drives 140, processing in response to a read request or a write request from the host system 200 can be executed at higher speeds. Incidentally, double memory packages 120 may be provided in order to avoid, for example, data loss at the time of the occurrence of a failure.

The back-end package 130 includes a port 131 and a memory 123. The port 131 is connected via a network 183 to the hard disk drives 140, so that write data from the host system 200 are written to the hard disk drives 140 and data are read from the hard disk drives 140 in response to a read request from the host system 200. The memory 132 temporarily stores data to be transferred to the hard disk drives 140 or data which have been read from the hard disk drives 140. Incidentally, the back-end package 130 may include one or more ports 131 and memories 132.

The hard disk drives 140 are storage media which store various data used for software executed by the host system 200. The hard disk drives 140 may be composed of a plurality of hard disk drives (HDD) including expensive hard disk drives such as SCSI (Small Computer System Interface) disks or inexpensive hard disk drives such as SATA (Serial AT Attachment) disks. Moreover, storage media other than the hard disk drives, such as flash memories, SSD's (Solid State Drives), or DVD's may be used.

For example, one or more hard disk drives 140 may be gathered as a unit called a parity group and formed into a highly reliable group such as a RAID (Redundant Arrays of Independent Disks). Furthermore, a parity group composed of one or more hard disk drives 140 may be divided into one or more logical areas, each of which may be treated as a logical storage device. This logical storage device is a logical volume described earlier and will be hereinafter simply referred to and explained as the volume 150.

The host system 200 is a computer device equipped with information processing resources such as a CPU (Central Processing Unit) and a memory and is composed of, for example, a personal computer, a workstation, or a mainframe. The CPU functions as an arithmetic processing unit and controls the operations of the host system 200 in accordance with programs and arithmetic parameters stored in the memory. Furthermore, the host system 200 includes information input devices such as a keyboard, a switch, a pointing device, and a microphone and information output devices such as a monitor display and a speaker.

Furthermore, the host system 200 is connected via a network 400 to the storage apparatus 100. The network 400 is composed of, for example, a SAN (Storage Area Network) and communications between devices are performed in accordance with, for example, a Fibre Channel Protocol. Furthermore, the network 400 may be, for example, a LAN (Local Area Network), the Internet, public circuits, or private circuits. When the network is a LAN, communications between devices may be performed in accordance with, for example, a TCP/IP (Transmission Control Protocol/Internet Protocol).

Furthermore, the host system 200 is a device for executing specified business processing by executing software for, for example, a data base management system. Then, part or all pieces of data used for the business processing executed by the host system 200 are stored in the storage apparatus 100. The host system 200 sends a read request or a write request to the storage apparatus 100 via the network 400 in order to refer to, or update, data stored in the storage apparatus 100.

The management terminal 300 is a computer device equipped with information processing resources such as a CPU (Central Processing Unit) and a memory and is composed of, for example, a personal computer. The CPU functions as an arithmetic processing unit and controls the operations of the management terminal 300 in accordance with programs and arithmetic parameters stored in the memory. Furthermore, the management terminal 300 includes information input devices such as a keyboard, a switch, a pointing device, and a microphone and information output devices such as a monitor display and a speaker. Furthermore, the management terminal 300 is connected via the network 180 for the storage apparatus 100 to the MPPK's 110 in the storage apparatus 100.

(3) Functional Structure of Storage Apparatus

With the storage apparatus 100 according to this embodiment as described above, an owner MPPK 110 in charge of processing is decided for each volume 150 in advance. Accordingly, an MPPK 110 for accessing control information required for the processing on the volume 150 can be limited to one MPPK 110 by deciding the owner MPPK 110 for each volume 150. As a result, the control information required for the processing can be stored in the local memory 112 for the MPPK 110 and the processing on the volume 150 can be executed at high speeds. Various control information for the storage apparatus 100 where the ownership is set to the volume 150 will be explained below in detail.

Figure 3:
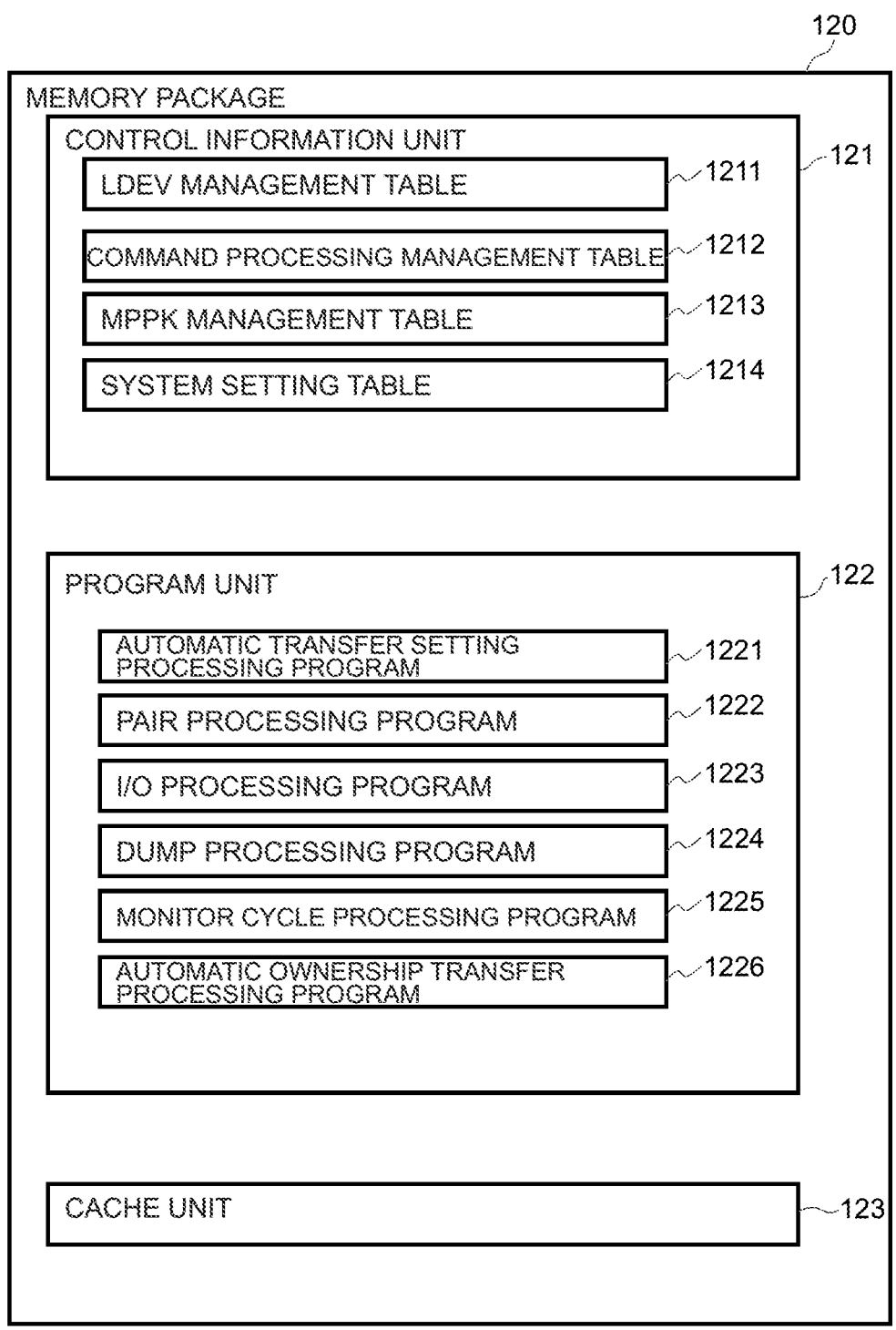
FIG. 3 is a block diagram illustrating a functional configuration of a storage apparatus according to the embodiment.

As depicted in FIG. 3, the control information unit 121 for the memory package 120 in the storage apparatus 100 stores, for example, an LDEV management table 1211, a command processing management table 1212, an MPPK management table 1213, a copy management table, and a system setting table 1215. Furthermore, the program unit 122 stores, for example, an automatic transfer setting processing program 1221, a pair processing program 1222, an I/O processing program 1223, a dump processing program 1224, a monitor cycle processing program 1225, and an automatic ownership transfer processing program 1226.

The automatic transfer setting processing program 1221 registers on/off setting of automatic ownership transfer, which indicates whether to automatically transfer the ownership in response to a request from the management terminal 300, in the system setting table 1215.

The pair processing program 1222 is a program for setting the settings of a volume pair in accordance with, for example, an I/O command from the host system 200 or a pair operation command from the management terminal 300. The pair processing program 1222 registers the content of pair settings in the copy management table.

The I/O processing program 1223 is a program for executing normal transaction processing and dump processing in accordance with an I/O command from the host system 200. The I/O processing program 1223 registers the results of command processing in the command processing management table 1212 and the MPPK management table 1213.

The dump processing program 1224 is activated by the I/O processing program 1223 and executes dump processing on FlashCopy secondary volumes and snapshot volumes. The dump processing is processing for taking in data of primary volumes and writing the taken-in data to, for example, tape drives. Furthermore, the dump processing program 1224 registers the start of the dump processing in the LDEV management table 1211. Furthermore, if the dump processing is executed intensively on some MPPK 110, the dump processing program 1224 activates the automatic ownership transfer processing program 1226 and transfers the ownership of the MPPK 110.

Furthermore, the monitor cycle processing program 1225 periodically monitors the load imposed by the dump processing on the MPPK's 110 to check if the load is biased toward a certain MPPK 110. If the load is biased to a certain MPPK 110, the monitor cycle processing program 1225 activates the automatic ownership transfer processing program 1126 and transfers the ownership of the MPPK 110.

The automatic ownership transfer processing program 1226 is activated by the dump processing program 1224 or the monitor cycle processing program 1225 to identify the ownership of the MPPK 110 to be transferred and transfers that ownership to another MPPK 110 in order to avoid a biased load of the dump processing.

(4) Various Tables

Next, the details of various tables mentioned above will be explained in detail.

The LDEV management table 1211 is a table for managing, for example, the ownership and pair status of the MPPK 110, and the status of the dump processing for each volume 150. As depicted in FIG. 4, the LDEV management table 1211 is constituted from an LDEV number (LDEV#) column 1211A, an automatic transfer column 1211B, an MPPK number (MPPK #) column 1211C, a pair setting column 1211D, an in-processing status column 1211E regarding dump processing, and a dump processing start time column 1211F.

The LDEV number (LDEV#) column 1211A stores the number for identifying the relevant volume. The automatic transfer column 1211B stores information indicating whether to automatically transfer the ownership of the relevant volume. For example, if the automatic transfer setting processing program 1221 permits automatic transfer of the ownership, the automatic transfer column 1211B stores "ON"; and if the automatic transfer setting processing program 1221 does not permit automatic transfer of the ownership, the automatic transfer column 1211B stores "OFF."

The MPPK number (MPPK #) column 1211C stores the number for identifying an MPPK 110 in charge of each volume. The pair setting column 1211D stores information of the pair setting of the relevant volume. For example, in a case of a secondary volume for a FlashCopy, the pair setting column 1211D stores information "FC Secondary."

Furthermore, the in-processing status column 1211E regarding the dump processing stores information indicating whether the dump processing is being executed on the relevant volume 150 or not. For example, if the dump processing is being executed, the in-processing status column 1211E stores "In Processing"; and if the dump processing is not executed, or if processing other than the dump processing is executed, the in-processing status column 1211E stores "unprocessed." Furthermore, if the dump processing is being executed, the dump processing start time column 1211F stores start time of that dump processing.

Next, the command processing management table 1212 will be explained. The command processing management table 1212 is a table for managing the content of command processing executed on each volume 150 in the past. As depicted in FIG. 5, the command processing management table 1212 is constituted from an LDEV number (LDEV#) column 1212A, an immediately preceding command type column 1212B, an immediately preceding processing completion time column 1212C, a command type column 1212D for a command two commands before the current one, and processing completion time column 1212D for a command two commands before the current one.

The LDEV number column 1212A stores the number for identifying the relevant volume. The immediately preceding command type column 1212B stores information of a command type of an immediately preceding command executed on the relevant command. For example, a command such as "RDTRK" or "WRD" is stored. The immediately preceding processing completion time column 1212C stores completion time of the command processing. FIG. 5 stores information about commands including a command two or more commands before the current one. Since whether the processing is the dump processing or not is judged by checking if "RDTRK" commands are executed sequentially, the command processing management table 121 stores command information about several commands executed in the past.

Next, the MPPK management table 1213 will be explained. The MPPK management table 1213 is a table for managing, for example, the number of volumes on which the dump processing is being executed, and an average operating ratio for each MPPK 110. As depicted in FIG. 6, the MPPK management table 1213 is constituted from an MPPK number (MPPK #) column 1213A, an automatic transfer column 1213B, a number-of-volumes-in-dump-processing column 1213C, a number-of-volumes-in-transaction-processing column 1213D, a number-of-volumes-in-other-processing column 1213E, an MP operating ratio column 1213F, a local copy column 1213G, an average response time column 1213H, and a transfer limitation column 1213I.

The MPPK number column 1213A stores the number for identifying the MPPK 110. The automatic transfer column 1213B stores information indicating whether to automatically transfer the ownership of a volume which the relevant MPPK 110 is in charge of. The number-of-volumes-in-dump-processing column 1213C stores the number of volumes which the MPPK 110 is in charge of, and on which the dump processing is being executed. The number-of-volumes-in-transaction-processing column 1213D stores the number of volumes which the MPPK 110 is in charge of, and on which the transaction processing is being executed. The number-of-volumes-in-other-processing column 1213E stores the number of volumes which the MPPK 110 is in charge of, and on which other processing is being executed. The number of volumes on which no processing is being executed and the number of volumes in which no data is stored may be counted as the number of volumes.

The MP operating ratio column 1213F stores information of an operating ratio of the MPPK 110. The local copy column 1213G stores information indicating what kind of copy pair exists in the volumes which the MPPK 110 is in charge of. The average response column 1213H stores information of an average response time of the MPPK 110. The transfer limitation column 1213I stores information of an ownership transfer limitation on the MPPK 110.

Next, the copy management table 1214 will be explained. The copy management table 1214 is a table for managing information of copy pairs of volumes. As depicted in FIG. 7, the copy management table 1214 is constituted from a pair number column 1214A, a volume number (VOL#) column 1214B, paired volume's volume number (VOL#) column 1214C, a pair's Begining Of Extent column 1214D, a pair's End Of Extent column 1214E, and a last RDTRK position column 1214E.

The pair number column 1214A stores information for identifying the relevant pair. The volume number (VOL#) column 1214B stores the number for identifying the relevant volume. The paired volume's volume number (VOL#) column 1214C stores the number for identifying the paired volume of the pair. The pair's Begining Of Extent column 1214D, the pair's End Of Extent column 1214E, and the last RDTRK position column 1214E store setting information about the range of the pair and the pair's last RDTRK position, respectively.

Next, the system setting table 1215 will be explained. The system setting table 1215 is a table for managing priority order information used to identify an MPPK 110 which is a transfer destination of the ownership. As depicted in FIG. 8, the system setting table 1215 is constituted from a priority order column (#) 1215A, a transfer standard priority column 1215B, an additional parameter column 1215C, and a supplement column 1215D.

The priority order column (#) 1215A stores the number indicating priority order. The smaller the number is, the higher the priority order becomes. The transfer standard priority column 1215B stores transfer standard information used to transfer the ownership. For example, at the time of transfer of the ownership, information about whether the number of dump job volumes should be prioritized or the MP operating ratio or the average response time should be prioritized is stored. The additional parameter column 1215C stores a parameter to be added to each transfer standard. An example of the additional parameter for the transfer standard includes information indicating the ownership transfer, for example, when the MP operating ratio is equal to or more than a specified value. Furthermore, the supplement column 1215D stores information about each transfer standard, indicating how to transfer the ownership.

(5) Details of Data Management Processing in Computer System (5-1) Processing for Judging Dump Processing Examples of I/O patterns from the host system 200 include an I/O pattern for the normal transaction processing and an I/O pattern for the dump processing as mentioned earlier. While the normal transaction processing is executed on a record basis, the dump processing takes in data on a track basis. So, regarding inputs/outputs for the dump processing, a data transfer amount of the dump processing is several tens of times as much as that of the normal transaction processing; and if the inputs/outputs for the dump processing are executed intensively on some MPPK 110, response performance will degrade.

So, in this embodiment, whether inputs/outputs from the host system 200 are for the dump processing or not is judged; and if the dump processing is executed intensively on some MPPK 110, the ownership of the MPPK 110 is transferred to average the operating ratio of the MPPK 110. Whether the inputs/outputs from the host system 200 are for the dump processing or not can be judged by checking if RDTRK commands used for the dump processing are received sequentially or not. The RDTRK command is a request command issued to read all tracks. If the command is not an RDTRK command or if RDTRK commands are not issued sequentially, it can be determined that the relevant processing is the normal transaction processing. Incidentally, there is a possibility that a certain dump processing command may be misjudged as a normal transaction processing command; however, since the RDTRK commands for the dump processing are issued sequentially, it is possible to immediately correct the misjudgment by a subsequent judgment.

Figure 9:
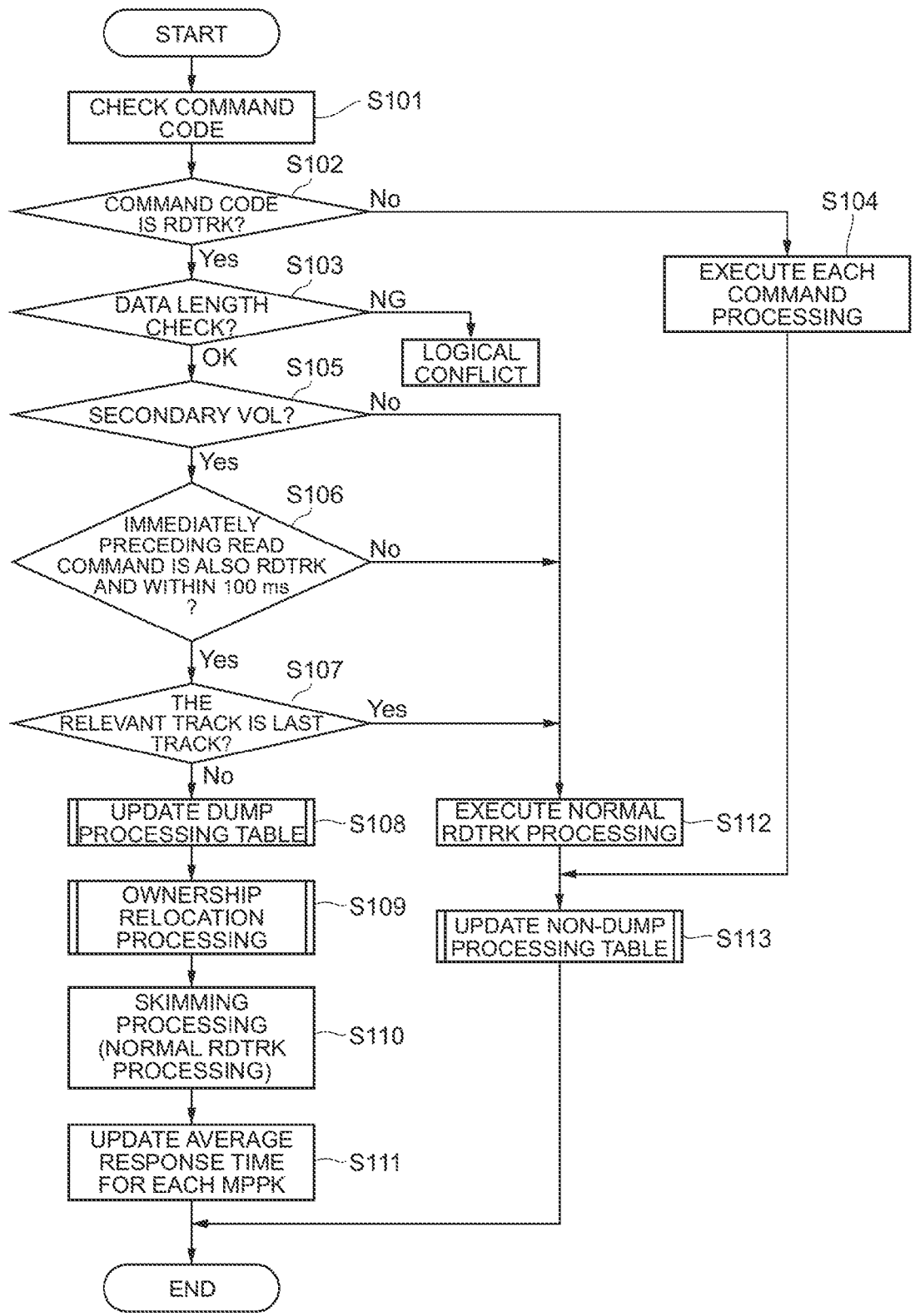
FIG. 9 is a flowchart illustrating I/O pattern judgment processing according to the embodiment.

I/O pattern judgment processing for judging whether inputs/outputs from the host system 200 are for the dump processing or not will be explained with reference to FIG. 9. As depicted in FIG. 9, the I/O processing program 1223 checks a received command code (S101) and judges whether the command code is an RDTRK or not (S102).

Then, if it is determined in step S102 that the command code is the RDTRK, the I/O processing program 1223 checks a data length included in the command code (S103) and judges whether the data length is proper or not, that is, whether any logical conflict exists or not.

If it is determined in step S103 that the data length is proper, the I/O processing program 1223 judges whether a volume which is a target of the command code is a secondary volume or not (S105). Specifically speaking, the I/O processing program 1223 refers to the LDEV management table 1211 and judges whether or not the relevant volume is a secondary volume such as a secondary volume for a Flash-Copy (FC Secondary) (S105).

If it is determined in step S105 that the target volume is not a secondary volume, the relevant command is not a command for the dump processing and, therefore, the I/O processing program 1223 executes normal RDTRK processing (S112) and executes table update processing for non-dump processing (S113). The table update processing for the non-dump processing in step S113 will be explained later in detail. On the other hand, if it is determined in step S105 that the target volume is a secondary volume, the I/O processing program 1223 executes the judgment processing in step S106.

The I/O processing program 1223 refers to the command processing management table 1212 and judges whether or not an immediately preceding read command for the relevant volume is an RDTRK command and was received 100 ms or less before (S106). The judgment in step S106 is performed to judge whether RDTRK commands are sent sequentially to the target volume of the command processing. The RDTRK commands for the dump processing are normally issued for one volume at intervals of several tens of milliseconds. Therefore, as a result of the judgment in step S106, whether inputs/outputs to/from the relevant volume are inputs/outputs for the dump processing or not can be judged.

If a negative judgment is returned in step S106, this means that the relevant command is not a command for the dump processing. So, the I/O processing program 1223 executes normal RDTRK processing (S112) and executes the table update processing for the non-dump processing (S113). On the other hand, if an affirmative judgment is returned in step S106, the I/O processing program 1223 judges whether a read target track is the last track or not (S107). Upon the dump processing, RDTRK commands are issued sequentially from the leading cylinder of the target secondary volume to the last cylinder. Accordingly, if an RDTRK command is issued to the last cylinder, it can be determined that the dump processing has terminated.

If it is determined in step S107 that the read target track is the last track, the I/O processing program 1223 determines that the dump processing has terminated, and then executes the normal RDTRK processing (S112) and executes the table update processing for the non-dump processing (S113). On the other hand, if it is determined in step S107 that the read target track is not the last track, the I/O processing program 1223 updates the tables for the dump processing (S108), activates the automatic ownership transfer processing program 1226, and makes it execute the ownership relocation processing (S109). The table update processing for the dump processing in step S108 and the ownership relocation processing in step S109 will be explained later in detail.

Then, the I/O processing program 1223 executes the normal RDTRK processing, that is, processing for reading data from a primary volume (S110) and then updates an average response time for each MPPK 110 (S111).

Next, the table update processing for the dump processing in step S108 described earlier will be explained. If it is determined as a result of the dump processing judgment in step S106 and step S107 that the relevant inputs/outputs are inputs/outputs for the dump processing, the LDEV management table 1211, the command processing management table 1212, and the MPPK management table 1213 are updated. The details of the table update processing for the dump processing will be explained below with reference to FIG. 10.

Figure 10:
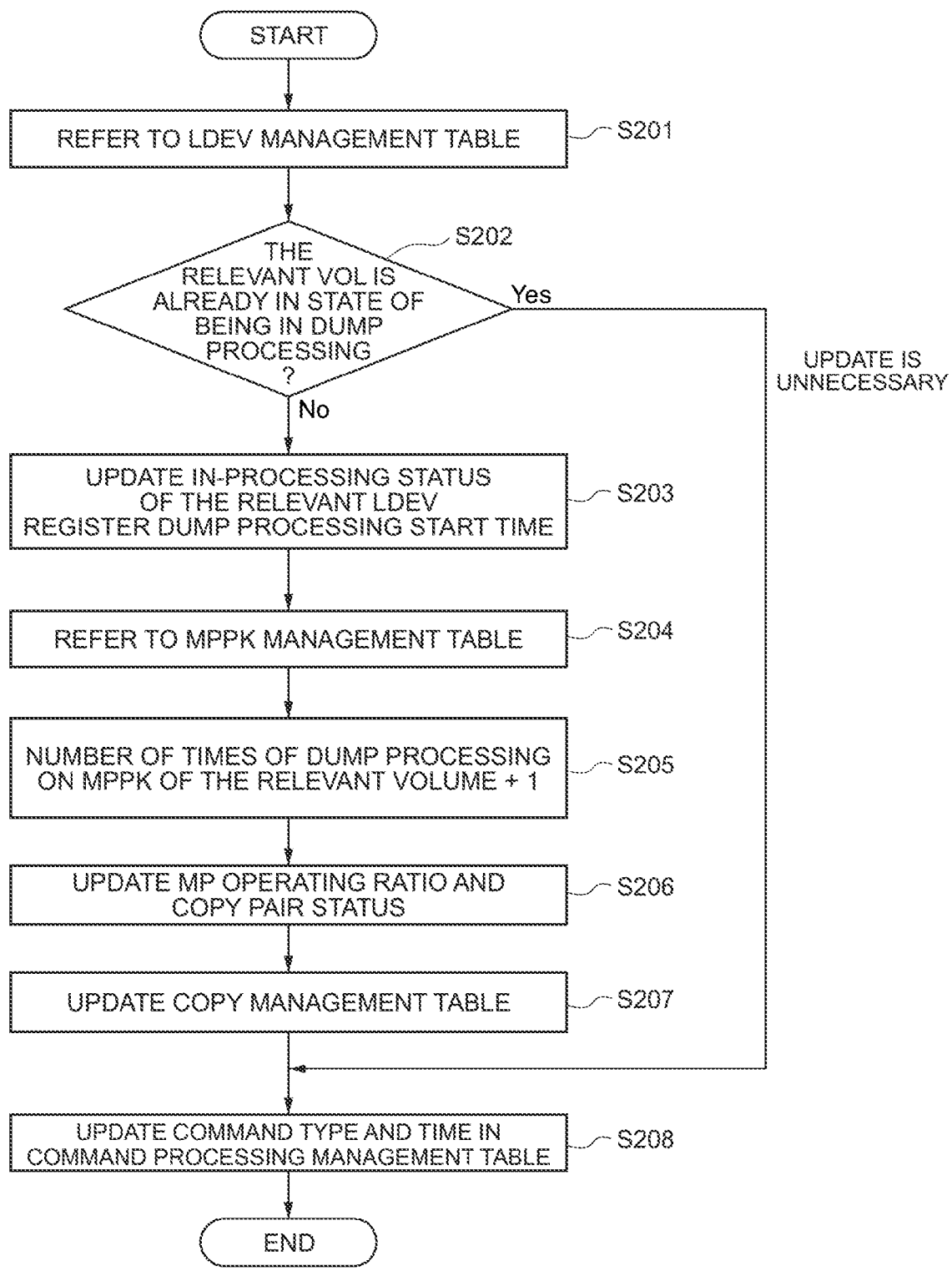
FIG. 10 is a flowchart illustrating table update processing for dump processing according to the embodiment.

As depicted in FIG. 10, the I/O processing program 1223 refers to the in-processing status column 1211E regarding the dump processing in an entry for the target volume in the LDEV management table 1211 (S202) and judges whether or not the status already indicates that the dump processing is being executed (S202).

If it is determined in step S201 that the status already indicates that the dump processing is being executed, the table update processing for the dump processing is not required, so that the I/O processing program 1223 proceeds to processing in step S207. On the other hand, if it is determined in step S201 that the status does not indicate that the dump processing is being executed, the I/O processing program 1223 updates the in-processing status in the LDEV management table 1211 and registers the dump processing start time (S203). Specifically speaking, the I/O processing program 1223 stores information indicating that the dump processing is being executed, in the in-processing status column 1211E regarding the dump processing in the LDEV management table 1211 and stores the start time of the dump processing in the dump processing start time column 1211F.

Next, the I/O processing program 1223 refers to the MPPK management table 1213 (S204), adds 1 to the number of times of execution of the dump processing in the entry for the MPPK in charge of the target volume (S205).

Specifically speaking, the I/O processing program 1223 adds 1 to the number-of-volumes-in-dump-processing column 1213C in the entry for the target MPPK in the MPPK management table 1213.

Subsequently, the I/O processing program 1223 updates the MP operating ratio and the copy pair status of the target MPPK in the MPPK management table 1213 (S206).

Then, the I/O processing program 1223 updates the last RDTRK position column 1214F in the copy management table 1214 (S207) and then updates the command type and time in the command processing management table 1212 (S208). Specifically speaking, the I/O processing program 1223 stores the command type in the immediately preceding command type column 1212B in the command processing management table 1212 and stores the processing completion time of the command in the immediately preceding processing completion time column 1212C.

Figure 11:
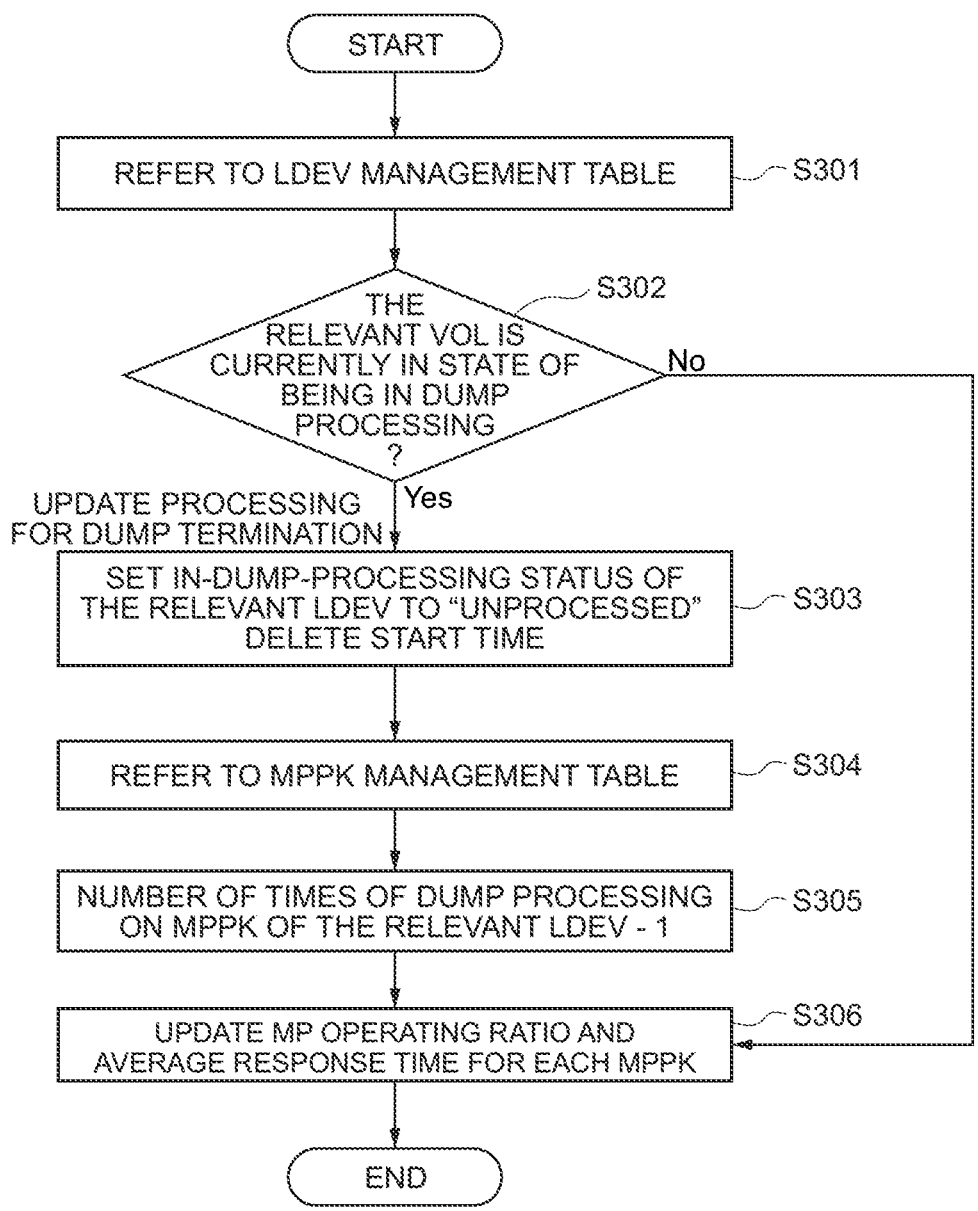
FIG. 11 is a flowchart illustrating table update processing for non-dump processing according to the embodiment.

Next, the table update processing for the non-dump processing in step S113 as mentioned earlier will be explained with reference to FIG. 11. As depicted in FIG. 11, the I/O processing program 1223 refers to the in-processing status column 1211E in the LDEV management table 1211 (S301) and judges whether or not the status already indicates that the dump processing is being executed (S302).

If it is determined in step S301 that the status already indicates that the dump processing is being executed, the I/O processing program 1223 executes processing in step S303 and subsequent steps. On the other hand, if it is determined in step S301 that the status does not indicate that the dump processing is being executed, the I/O processing program 1223 executes processing in step S306.

The I/O processing program 1223 sets the in-processing status in the LDEV management table 1211 to "unprocessed" in step S303 and deletes the dump processing start time (S303). Specifically speaking, the I/O processing program 1223 stores information indicating "unprocessed" in the in-processing status column 1211E regarding the dump processing in the LDEV management table 1211 and deletes the stat time in the dump processing start time column 1211F.

Then, the I/O processing program 1223 refers to the MPPK management table 1213 (S303) and subtracts 1 from the number of times of execution of the dump processing in an entry for the MPPK in charge of the target volume (S304). Specifically speaking, the I/O processing program 1223 subtracts 1 from the number-of-volumes-in-dump-processing column 1213C in the entry for the target MPPK in the MPPK management table 1213.

Then, the I/O processing program 1223 updates the MP operating ratio of the target MPPK and the average response time for each MPPK in the MPPK management table 1213 (S306).

Next, table update processing executed when a snapshot or FlashCopy pair is created or deleted will be explained. The table update processing at the time of creation or deletion of a copy pair is executed by the pair processing program 1222.

Figure 12A:
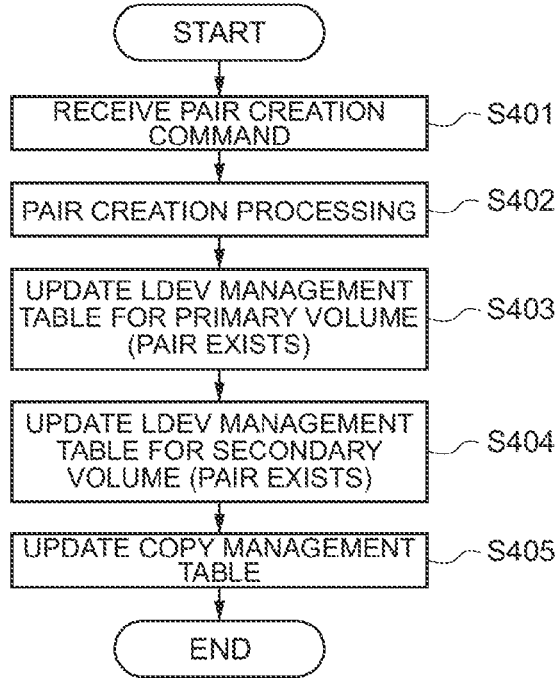
FIG. 12A is a flowchart illustrating table update processing upon creation of a copy pair according to the embodiment.

Firstly, the table update processing at the time of creation of a copy pair will be explained. When the pair processing program 1222 receives a pair creation command as depicted in FIG. 12A (S401), it executes pair creation processing (S402).

Then, the pair processing program 1222 updates the LDEV management table 1211 for a primary volume (S403). Specifically speaking, the pair processing program 1222 stores information, which indicates that a copy pair exists, in the pair setting column 1211D in an entry for the primary volume in the LDEV management table 1211. Furthermore, information indicating what kind of copy pair exists for the relevant volume may be stored.

Next, the pair processing program 1222 updates the LDEV management table 1211 for a secondary volume (S404). Specifically speaking, the pair processing program 1222 stores information, which indicates that a copy pair exists, in the pair setting column 1211D in an entry for the secondary volume in the LDEV management table 1211. Furthermore, information indicating what kind of copy pair exists for the relevant volume may be stored.

Then, the pair processing program 1222 updates the copy management table 1214 (S405). Specifically speaking, the pair processing program 1222 stores the volume number of the primary volume in the volume number column 1214B in the copy management table 1214, stores the volume number of the secondary volume in the paired volume's volume number column 1214O, and stores information of the pair's Beginning Of Extent, the pair's End Of Extent, and the last RDTRK position, respectively.

Figure 12B:
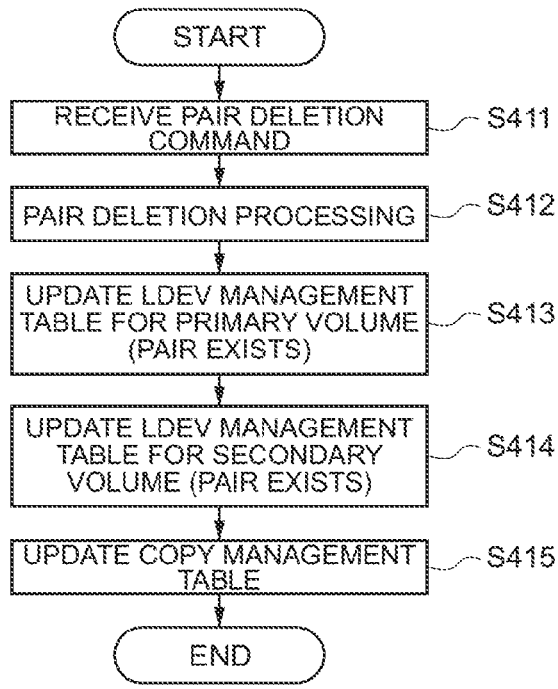
FIG. 12B is a flowchart illustrating table update processing upon deletion of a copy pair according to the embodiment.

Next, the table update processing at the time of deletion of a copy pair will be explained. When the pair processing program 1222 receives a pair deletion command as depicted in FIG. 12B (S411), it executes pair deletion processing (S412).

Then, the pair processing program 1222 updates the LDEV management table 1211 for the primary volume (S413). Specifically speaking, the pair processing program 1222 stores information, which indicates that no copy pair exists, in the pair setting column 1211D in the entry for the primary volume in the LDEV management table 1211.

Next, the pair processing program 1222 updates the LDEV management table 1211 for the secondary volume (S414). Specifically speaking, the pair processing program 1222 stores information, which indicates that no copy pair exists, in the pair setting column 1211D in the entry for the secondary volume in the LDEV management table 1211.

Then, the pair processing program 1222 updates the copy management table 1214 (S415). Specifically speaking, the pair processing program 1222 deletes information of the relevant copy pair from the copy management table 1214.

Next, table update processing which is set via the management terminal 300 will be explained. The automatic transfer setting processing program 1221 have various settings of automatic transfer for MPPKs, which are entered via a management screen for the management terminal 300, reflected in the LDEV management table 1211, the MPPK management table 1213, and the system setting table 1215.

Firstly, the management screen for entering various settings of the automatic transfer for MPPK's to the management terminal 300 will be explained. The LDEV management screen 351 is a management screen to set the automatic transfer of the MPPK 110 in charge of each volume. As depicted in FIG. 13A, the LDEV management screen 351 includes an LDEV number field 3511, an MPPK number field 3512, and an automatic transfer field 3513.

The LDEV number field 3511 displays a volume number. The MPPK number field 3512 stores the number of the MPPK 110. The automatic transfer field 3513 displays a check box to select whether to set the automatic transfer or not. When setting the automatic transfer of the MPPK 110 in charge of each volume, the system administrator checks the check box in the automatic transfer field 3513. In this case, "ON" is displayed in the automatic transfer field 3513. Furthermore, when the MPPK 110 in charge of each volume is not to be transferred automatically, the check box in the automatic transfer field 3513 is not checked. In this case, "OFF" is displayed in the automatic transfer field 3513.

When the setting of the automatic transfer field 3513 on the LDEV management screen 351 is changed by the administrator's input, the automatic transfer setting processing program 1221 changes a value of the automatic transfer column 1211B in the LDEV management table 1211.

The MPPK management screen 352 is a management screen to set the automatic transfer of the ownership of each MPPK 110. As depicted in FIG. 13B, the MPPK management screen 352 includes an MPPK number field 3521, an automatic transfer field 3522, and a transfer limitation field 3523.

The MPPK number field 3521 displays the number of the MPPK. The automatic transfer field 3522 displays a check box to select whether to set the automatic transfer or not. When setting the automatic transfer of the MPPK 110, the system administrator checks the check box in the automatic transfer field 3522. In this case, "ON" is displayed in the automatic transfer field 3522. Furthermore, when the MPPK 110 in charge of each volume is not to be transferred automatically, the check box in the automatic transfer field 3522 is not checked. In this case, "OFF" is displayed in the automatic transfer field 3522.

The transfer limitation field 3523 displays setting information of a transfer limitation. The transfer limitation on the MPPK 110 is information indicating whether the ownership transfer of each MPPK should be limited or not. For example, the transfer of the ownership of a certain MPPK 110 to a target volume of the dump processing can be limited or the ownership can be set preferentially to the target volume of the dump processing. For example, when there is no transfer limitation in the transfer limitation field 3523, the system administrator selects "None"; when the dump processing is to be prohibited, the system administrator selects "Prohibit Dump"; and when the dump processing is to be prioritized, the system administrator selects "Prioritize Dump."

If the setting of the automatic transfer field 3522 in the MPPK management screen 352 is changed by the administrator's input, the automatic transfer setting processing program 1221 changes a value of the automatic transfer column 1213B in the MPPK management table 1213. Furthermore, if the setting of the transfer limitation field 3523 is changed, the automatic transfer setting processing program 1221 changes a value of the transfer limitation column 1213I in the MPPK management table 1213.

The system setting screen 353 is a management screen to set priority order information used to transfer the ownership. As depicted in FIG. 13C, the system setting screen 353 includes a priority order field 3531 and a setting content field 3532. The priority order field 3531 displays a number indicating priority order; and the smaller the number is, the higher the priority order is. Furthermore, the setting content field 3532 displays selling information of a transfer standard for transferring the ownership. For example, when the number of dump jobs, the MP operating ratio, or the average response time is used as a standard for the ownership transfer, the system administrator sets the number of dump jobs from the setting content field 3532 as a first priority, the MP operating ratio as a second priority, and the average response time as a third priority.

When the priority order information of the system setting screen 353 is changed by the administrator's input, the automatic transfer setting processing program 1221 changes the value of the transfer standard priority column 1215B in the system setting table 1215. The table update processing is set via the management terminal 300 as explained above.

(5-2) Ownership Relocation Processing

Next, the details of the ownership relocation processing will be explained. There are possible ways of activating the ownership relocation processing: a case where the ownership relocation processing is executed in synchronization with the I/O processing depicted in FIG. 9; and a case where the ownership relocation processing is activated periodically. The ownership relocation processing is activated periodically by the monitor cycle processing program 1225.

Figure 14:
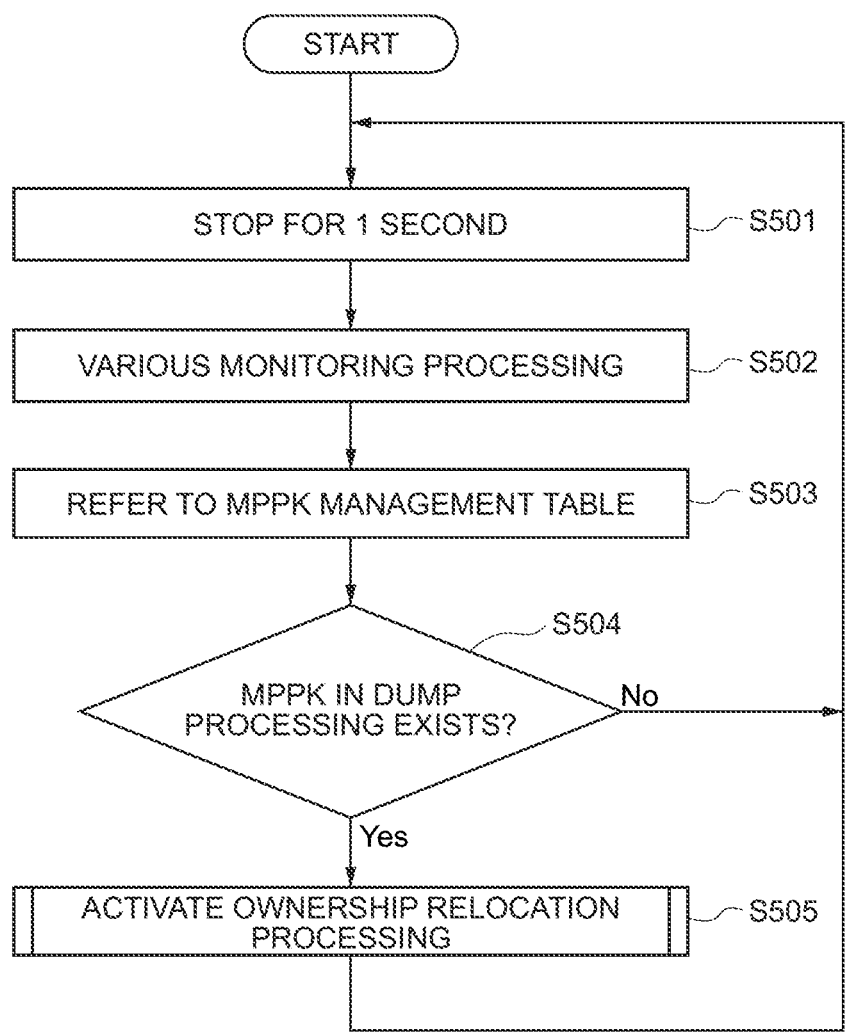
FIG. 14 is a flowchart illustrating processing for activating ownership relocation processing according to the embodiment.

FIG. 14 explains the processing for activating the ownership relocation processing by periodical processing will be explained. In this embodiment, the ownership relocation processing is activated at intervals of one second. As depicted in FIG. 14, the monitor cycle processing program 1225 stops the processing for activating the ownership relocation processing for one second (S501). A monitor cycle is set at intervals of one second by stopping the processing for activating the ownership relocation processing for one second in step S501.

Then, the monitor cycle processing program 1225 activates various monitoring processing (S502). The various monitoring processing in step S502 includes, for example, processing for calculating the MPPK operating ratio or the average response time.

Then, the monitor cycle processing program 1225 refers to the MPPK management table 1213 (S503) and judges whether the dump processing is being executed on any MPPK (S504). Specifically speaking, when the monitor cycle processing program 1225 refers to the number-of-volumes-in-dump-processing column 1213C in the MPPK management table 1213 and the number of volumes on which the dump processing is being executed is 1 or more, whether the dump processing is being executed on any MPPK can be judged.

If it is determined in step S504 that an MPPK on which the dump processing is being executed exists, the monitor cycle processing program 1225 activates the automatic ownership transfer processing program 1226 and executes the ownership relocation processing (S505). On the other hand, if it is determined in step S504 that no MPPK on which the dump processing is being executed exists, the monitor cycle processing program 1225 repeats processing in step S501 and subsequent steps.

In this embodiment, the ownership of the MPPK 110 is relocated based on the number of dump job volumes, the MP operating ratio of the MPPK 110, or the average response time of the MPPK. Furthermore, the ownership transfer can be inhibited in consideration of the number of transaction volumes and whether execution limitations on the dump processing exist or not. The standards for relocation of the ownership will be explained in detail.

When the ownership is relocated based on the number of dump job volumes as the standard, the ownership transfer is repeated until the number of dump job volumes for each MPPK 110 becomes an average value or less. When the ownership is to be transferred, the ownership transfer is started from an MPPK 110 for the largest number of dump job volumes. The number of dump job volumes is the most important element to judge I/O multiplicity; and the MP operating ratio of the MPPK 110 described below is an additional element for the transfer of the MPPK's ownership.

When the ownership is to be relocated based on the operating ratio of the MPPK 110 as the standard, the ownership transfer is started from an MPPK with the highest MP operating ratio. Furthermore, when the ownership is to be relocated base on the average response time of the MPPK 110 as the standard, the ownership is transferred to average the average response time of each MPPK 110.

Furthermore, when the ownership is to be relocated based on the number of transaction volumes as the standard, the ownership transfer to a volume on which the number of transaction volumes is concentrated is inhibited. Furthermore, the ownership transfer is inhibited when the ownership is to be relocated base on whether the execution limitations on the dump processing exist or not as the standard and the execution limitations on the dump processing are designated by the system administrator's input. For example, if an MPPK 110 which is an ownership transfer destination is prohibited from executing the dump processing, transfer of the ownership of a target volume of the dump processing to that MPPK 110 is prohibited. Furthermore, if an MPPK 110 which is an ownership transfer source is prioritized to execute the dump processing, the ownership transfer to that MPPK 110 is prohibited.

Figure 15:
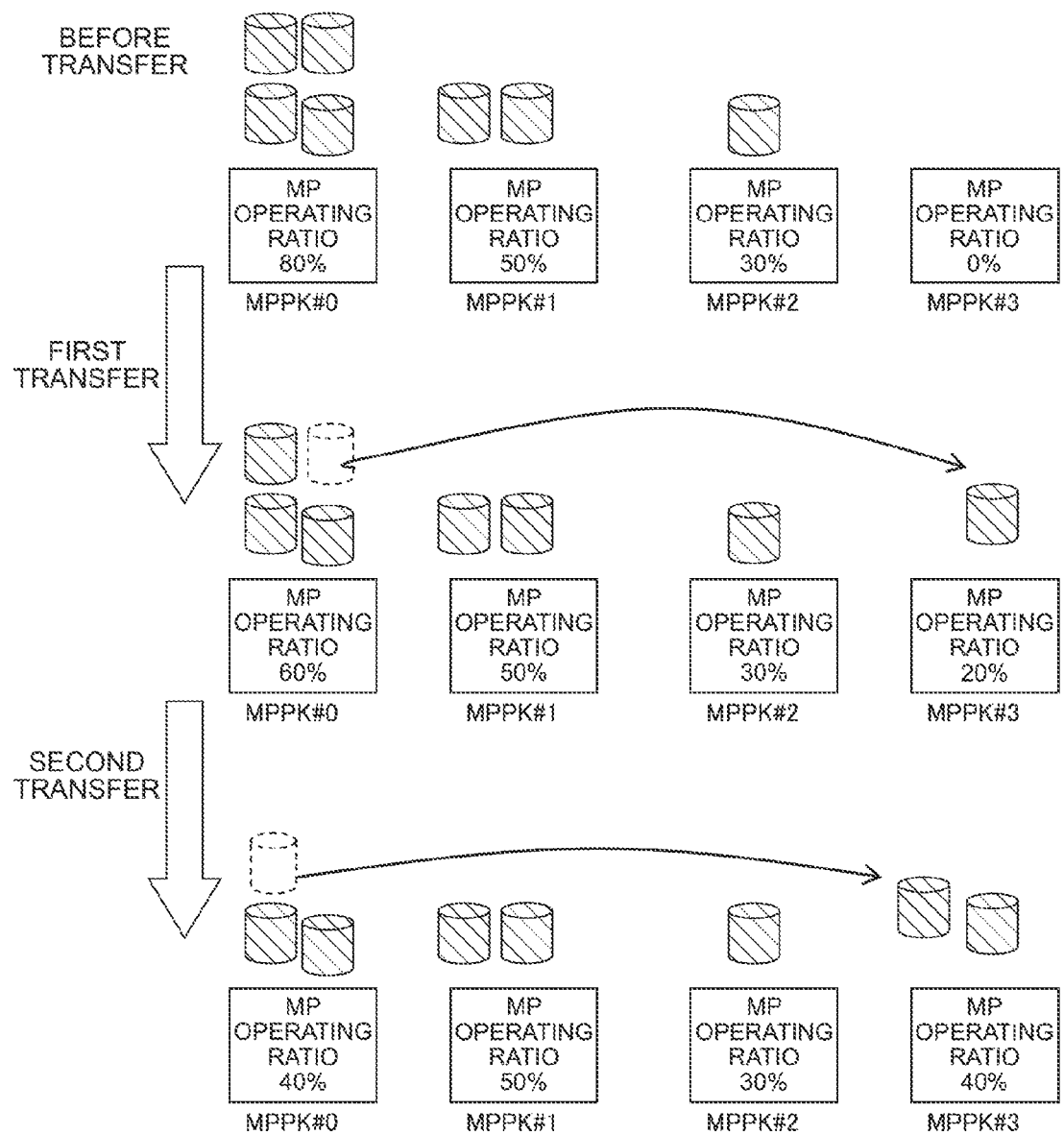
FIG. 15 is a conceptual diagram illustrating an example of ownership relocation processing according to the embodiment.

Next, examples of the ownership relocation processing will be explained with reference to FIG. 15 and FIG. 16. FIG. 15 illustrates a case where the number of dump job volumes and the MP operating ratio are used as the standards to relocate the ownership. Before the ownership transfer as depicted in FIG. 15, the number of dump jobs for MPPK #0 is 4 and its MP operating ratio is 80%, the number of dump jobs for MPPK #1 is 2 and its MP operating ratio is 50%, the number of dump jobs for MPPK #2 is 1 and its MP operating ratio is 30%, and the number of dump jobs for MPPK #3 is 0 and its MP operating ratio is 0%.

In this case, the ownership of MPPK #0 for the largest number of dump job volumes is firstly transferred. Specifically speaking, the ownership of one dump job is transferred from MPPK #0 whose number of dump jobs is 4 to MPP #3 whose number of dump jobs is 0.

As a result of the above-described ownership transfer, the number of dump jobs for MPPK #0 becomes 3 and its MP operating ratio becomes 60%, the number of dump jobs for MPPK #1 is 2 and its MP operating ratio is 50%, the number of dump jobs for MPPK #2 is 1 and its MP operating ratio is 30%, and the number of dump jobs for MPPK #3 becomes 1 and its MP operating ratio becomes 20%.

After the first ownership transfer described above, the number of dump jobs for MPPK #0 is still larger than that of other MPPK's. So, the ownership of dump jobs for MPPK #0 is further transferred to another MPPK. Under this circumstance, the number of dump jobs for MPPK #2 and MPPK #3 is the same, which is one. Accordingly, which MPPK should be a transfer destination is decided based on the MP operating ratio. Referring to FIG. 15, the MP operating ratio of MPPK #2 is 30% and the MP operating ratio of MPPK #3 is 20%, MPPK #3 of the lower MP operating ratio is decided as the ownership transfer destination.

As a result of the above-described ownership transfer, the number of dump jobs for MPPK #0 becomes 2 and its MP operating ratio becomes 40%, the number of dump jobs for MPPK #1 is 2 and its MP operating ratio is 50%, the number of dump jobs for MPPK #2 is 1 and its MP operating ratio is 30%, and the number of dump jobs for MPPK #3 becomes 2 and its MP operating ratio becomes 40%. Now, it can be seen that the number of dump jobs and the MP operating ratio for each MPPK have been averaged.

Figure 16:
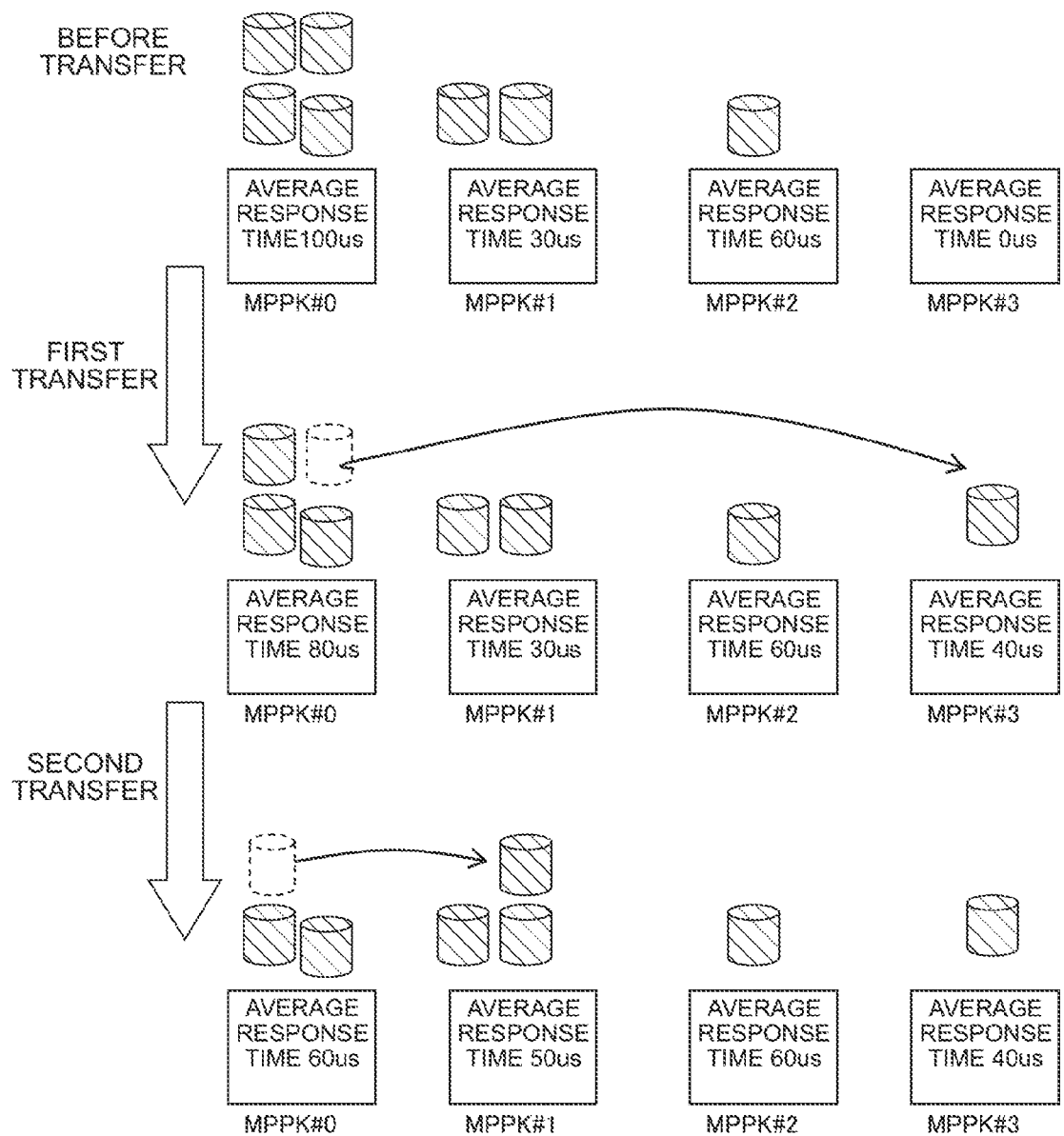
FIG. 16 is a conceptual diagram illustrating an example of the ownership relocation processing according to the embodiment.

Furthermore, FIG. 16 illustrates a case where the ownership is relocated based on the number of dump job volumes and the average response time as the standards. Before the ownership transfer as depicted in FIG. 16, the number of dump jobs for MPPK #0 is 4 and its average response time is 100 us, the number of dump jobs for MPPK #1 is 2 and its average response time is 30 us, the number of dump jobs for MPPK #2 is 1 and its average response time is 60 us, and the number of dump jobs for MPPK #3 is 0 and its average response time is 0 us.

In this case, the ownership of MPPK #0 for the largest number of dump job volumes is firstly transferred. Specifically speaking, the ownership of one dump job is transferred from MPPK #0 whose number of dump jobs is 4 to MPPK #3 whose number of dump jobs is 0.

As a result of the ownership transfer described above, the number of dump jobs for MPPK #0 becomes 3 and its average response time becomes 80 us, the number of dump jobs for MPPK #1 is 2 and its average response time is 30 us, the number of dump jobs for MPPK #2 is 1 and its average response time is 60 us, and the number of dump jobs for MPPK #3 becomes 1 and its average response time becomes 40 us.

After the first ownership transfer, the number of dump jobs for MPPK #0 is still larger than that of other MPPK's. So, the ownership of dump jobs for MPPK #0 is transferred to another MPPK. Under this circumstance, which MPPK should be a transfer destination is decided based on the average response time. Referring to FIG. 16, the average response time of MPPK #1 is 30 us, the average response time of MPPK #2 is 60 us, and the average response time of MPPK #3 is 40 us, so that MPPK #1 with the best average response time is decided as the ownership transfer destination.

As a result of the above-described ownership transfer, the number of dump jobs for MPPK #0 becomes 2 and its average response time becomes 60 us, the number of dump jobs for MPPK #1 becomes 3 and its average response time becomes 50 us, the number of dump jobs for MPPK #2 is 1 and its average response time is 60 us, and the number of dump jobs for MPPK #3 is 1 and its average response time is 40 us. So, it can be seen that the average response time of each MPPK 110 has been averaged.

Furthermore, if the dump processing is executed on a volume which the MPPK 110 prohibited from executing the dump processing is in charge of, that dump processing may be transferred to another MPPK 110. Furthermore, when the ownership of the MPPK 110 is transferred as described above, it is possible to prevent the ownership transfer to the MPPK 110 which is prohibited from executing the dump processing.

Furthermore, the MPPK 110 which preferentially executes the dump processing may be decided as the ownership transfer destination of the dump processing.

Figure 17:
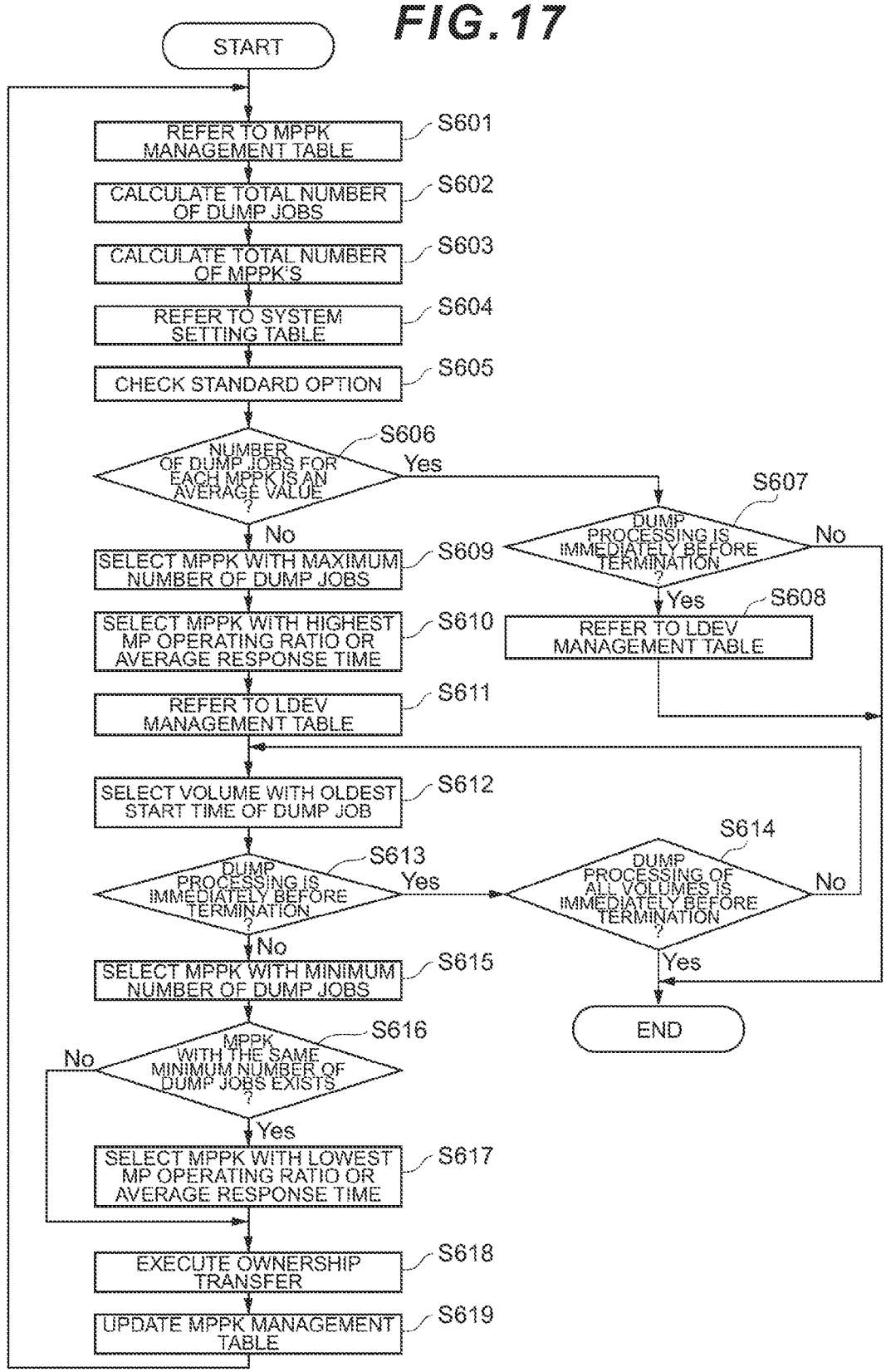
FIG. 17 is a flowchart illustrating the details of the ownership relocation processing according to the embodiment.

Next, the details of the ownership relocation processing will be explained with reference to FIG. 17. As depicted in FIG. 17, the automatic ownership transfer processing program 1226 firstly refers to the MPPK management table 1213 (S601) and calculates a total number of dump jobs by adding the number of dump jobs of all the MPPK's 110 (S602). Furthermore, the automatic ownership transfer processing program 1226 calculates the total number of MPPK's (S603). If an MPPK(s) to which a dump prohibition setting is set exists in step S603, the number of such MPPK(s) is subtracted from the total number of MPPK's.

Subsequently, the automatic ownership transfer processing program 1226 refers to the system setting table 1215 and checks a standard option for transfer of the MPPK (S605). The standard option in step S605 is an additional standard such as the MP operating ratio or the average response time which serves as a standard after transferring the ownership based on the number of volumes for the dump processing as described earlier.

Then, the automatic ownership transfer processing program 1226 judges whether the number of dump jobs of each MPPK 110 is averaged or not (S606). Specifically speaking, the automatic ownership transfer processing program 1226 judges whether the number of dump jobs is biased or not, by comparing a value obtained by dividing the total number of MPPK's calculated in step S603 by the total number of dump jobs calculated in step S602, with the number of dump jobs of each MPPK 110.

If it is determined in step S606 that the number of dump jobs is not averaged, the automatic ownership transfer processing program 1226 executes processing in step S609 and subsequent steps. On the other hand, if it is determined in step S606 that the number of dump jobs is averaged, the automatic ownership transfer processing program 1226 executes processing in step S607 and subsequent steps.

In step S607, the automatic ownership transfer processing program 1226 judges whether any MPPK 110 is prohibited from executing the dump processing (S607). Specifically speaking, the automatic ownership transfer processing program 1226 refers to the transfer limitation column 1213I in the MPPK management table 1213 and judges whether the transfer limitation to prohibit the execution of dump jobs is set to each MPPK 110 or not.

If it is determined in step S607 that there is no MPPK 110 which is prohibited from executing the dump processing, the automatic ownership transfer processing program 1226 terminates the relocation processing. On the other hand, if it is determined in step S607 that there is an MPPK(s) 110 which is prohibited from executing the dump processing, the automatic ownership transfer processing program 1226 decides the MPPK 110, which is prohibited from executing the dump processing, as an ownership transfer source and transfers the ownership of the dump processing to another MPPK (S608), thereby terminating the processing.

In step S609, the automatic ownership transfer processing program 1226 selects an MPPK 110 for the maximum number of dump jobs (S609). Then, the automatic ownership transfer processing program 1226 selects an MPPK 110 with the highest MP operating ratio (S610). If a plurality of MPPK's 110 for the same maximum number of dump jobs exist in step S609, the processing in step S610 may be executed. Furthermore, if the standard option is the average response time as described earlier, an MPPK 110 with the best average response time may be selected in step S610.

Subsequently, the automatic ownership transfer processing program 1226 refers to the LDEV management table 1211 (S611) and selects a dump job volume whose start time of the dump processing is the oldest (S612). Then, the automatic ownership transfer processing program 1226 judges whether the dump processing of the volume selected in step S612 is immediately before termination or not (S613).

If it is determined in step S613 that the dump processing of the selected volume is immediately before termination, the automatic ownership transfer processing program 1226 judges whether the dump processing of all volumes is immediately before termination or not (S614). If it is determined in step S614 that the dump processing of all volumes is immediately before termination, the automatic ownership transfer processing program 1226 terminates the ownership relocation processing. On the other hand, if it is determined that the dump processing of all volumes is not immediately before termination, the automatic ownership transfer processing program 1226 returns to step S612 and then select a dump job volume whose start time is the second oldest.

Under this circumstance, whether the dump processing is immediately before termination or not can be judged by referring to the copy management table 1214 in FIG. 7. For example, the judgment be made by checking whether a value of the last RDTRK position column 1214F in the copy management table 1214 satisfies the following formula or not.

[Math. 1]

$$\text{Last RDTRK Position} \geq ((\text{End Of Extent} - \text{Leading Position})*0.8 + \text{Leading Position}) \quad (1)$$

If the value of the last RDTRK position column 1214F satisfies the above formula (1), it means that the dump processing is close to its termination. So, it is found that it is unnecessary to transfer the ownership of the relevant dump processing.

As a result of the processing in steps S609 to S613, the MPPK which is the transfer source for relocating the ownership is decided. Next, an MPPK which is a transfer destination for relocating the ownership is decided by processing described below.

The automatic ownership transfer processing program 1226 selects an MPPK for the minimum number of dump jobs from among the MPPK's in charge of the dump processing (S615). Then, the automatic ownership transfer processing program 1226 judges whether any MPPK for the same minimum number of dump jobs exists or not (S616).

If it is determined in step S616 that an MPPK for the same minimum number of dump jobs exists, the automatic ownership transfer processing program 1226 selects an MPPK with the lowest MP operating ratio or average response time from among the MPPK's 110 for the minimum number of dump jobs (S617). If it is determined in step S616 that an MPPK for the same minimum number of dump jobs does not exists, the automatic ownership transfer processing program 1226 executes processing in step S618 and subsequent steps.

Then, the automatic ownership transfer processing program 1226 decides the MPPK 110 selected in step S609 and step S610 as the transfer source and the MPPK 110 selected in step S615 and step S617 as the transfer destination and then executes the ownership transfer processing (S618). After executing the ownership transfer processing in step S618, the automatic ownership transfer processing program 1226 updates the MPPK management table 1213 (S619). Specifically speaking, the automatic ownership transfer processing program 1226 changes the value of the number-of-volumes-in-dump-processing column 1213C in the MPPK management table 1213.

As a result of the ownership relocation processing, the processing load of the dump processing can be averaged among the MPPK's 110 by transferring the ownership of an MPPK 110 for a large number of dump jobs to an MPPK 110 for a small number of dump jobs.

(6) Advantageous Effects of this Embodiment

According to this embodiment as described above, a plurality of MPPK's 110 judge whether a received I/O request for a logical volume is I/O for dump processing or not; and when it is I/O for the dump processing, processing load bias for the dump processing, which each microprocessor (MPPK 110) is in charge of, is calculated, a microprocessor with high processing load of the dump processing is decided as a transfer source, and a microprocessor with low processing load of the dump processing is decided as a transfer destination, thereby executing ownership transfer processing. As a result, the ownership of the microprocessor is relocated according to multiplicity of the dump processing and the processing performance of the entire storage apparatus can be enhanced.

REFERENCE SIGNS LIST

100 storage apparatus
110 MPPK
120 memory package
140 hard disk drives
150 logical volume
1221 automatic transfer setting processing program
1222 pair processing program
1223 I/O processing program
1224 dump processing program
1225 monitor cycle processing program
1226 automatic ownership transfer processing program
200 host system
300 management terminal

The invention claimed is:
1. A storage apparatus comprising:
a plurality of microprocessors;
a plurality of storage areas formed into a drive group constituted from a plurality of physical drives; and
a control unit for managing one of the microprocessors, which takes charge of data input to and output from one or more storage areas of the plurality of storage areas, as a microprocessor having ownership of the one or more storage areas;
wherein the microprocessor executes dump processing for having an external physical drive store data of the one or more storage areas, for which the microprocessor takes charge of the data input and output, in response to a received I/O request; and
wherein the control unit transfers the ownership of the microprocessor according to processing load bias of the dump processing which the plurality of microprocessors take charge of
wherein when the received I/O pattern is an RDTRK command to read all areas of the storage areas, a read target of the RDTRK command is a storage area which forms a copy pair with another storage area, and the control unit sequentially receives the RDTRK command at specified intervals, the control unit determines that the dump processing by the microprocessor has started.

2. The storage apparatus according to claim 1, wherein the control unit transfers the ownership of the microprocessor according to usage of the microprocessor including an operating ratio or average response time of the microprocessor.

3. The storage apparatus according to claim 2, wherein the control unit:
manages the microprocessors and the number of storage areas which become targets of the dump processing executed by the microprocessors, by associating them with each other; and
selects one of the microprocessors for a maximum number of storage areas for the dump processing to be executed as a microprocessor which is a transfer source of the ownership, selects another microprocessor for a minimum number of storage areas for the dump processing to be executed as a microprocessor which is a transfer destination of the ownership, and transfers the ownership from the transfer source microprocessor to the transfer destination microprocessor.

4. The storage apparatus according to claim 3, wherein when the microprocessor for the maximum number of storage areas for the dump processing to be executed exists in plurality, the control unit selects the microprocessor whose operating ratio is high or the microprocessor whose average response time is low, as the microprocessor which is the transfer source of the ownership.

5. The storage apparatus according to claim 4, wherein when the microprocessor for the minimum number of storage areas for the dump processing to be executed exists in plurality, the control unit selects the microprocessor whose operating ratio is low or the microprocessor whose average response time is high, as the microprocessor which is the transfer destination of the ownership.

6. The storage apparatus according to claim 5, wherein the control unit judges whether the microprocessor has started or terminated the dump processing, based on a received I/O pattern.

7. The storage apparatus according to claim 5, wherein the control unit specifies a microprocessor which is not allowed to execute the dump processing, from among the plurality of microprocessors; and
wherein when the microprocessor executes the dump processing, the control unit transfers the microprocessor's ownership of the dump processing to another microprocessor.

8. The storage apparatus according to claim 5, wherein the control unit:
specifies a microprocessor which is made to preferentially execute the dump processing, from among the plurality of microprocessors; and
preferentially transfers another microprocessor's ownership of the dump processing to the microprocessor which is made to preferentially execute the dump processing.

9. The storage apparatus according to claim 1, wherein when the control unit has not received the RDTRK command sequentially at the specified intervals and receives normal transaction processing for storage areas, which are targets of the dump processing, and the RDTRK command is issued to a tail end of the storage areas which are the targets of the dump processing, the control unit determines that the dump processing by the microprocessor has terminated.

10. The storage apparatus according to claim 1, wherein the control unit transfers the ownership of the microprocessor in accordance with predetermined priority information; and wherein the priority information includes information of the number of storage areas for the dump processing and an operating ratio or average response time of the microprocessor.

11. A storage apparatus comprising:
a plurality of microprocessors;
a plurality of storage areas formed into a drive group constituted from a plurality of physical drives; and
a control unit for managing one of the microprocessors, which takes charge of data input to and output from one or more storage areas of the plurality of storage areas, as a microprocessor having ownership of the one or more storage areas;
wherein the microprocessor executes dump processing for having an external physical drive store data of the one or more storage areas, for which the microprocessor takes charge of the data input and output, in response to a received I/O request; and
wherein the control unit:
determines that the dump processing by the microprocessor has started when the received I/O pattern is an RDTRK command to read all areas of the storage areas, a read target of the RDTRK command is a storage area which forms a copy pair with another storage area, and the control unit sequentially receives the RDTRK command at specified intervals;
determines that the dump processing by the microprocessor has terminated when the control unit has not received the RDTRK command sequentially at the specified intervals and receives normal transaction processing for storage areas, which are targets of the dump processing, and the RDTRK command is issued to a tail end of the storage areas which are the targets of the dump processing;
obtains usage information of the MPPK including processing load bias of the dump processing, which the plurality of microprocessors take charge of, and an operating ratio or average response time of the MPPK;
manages the microprocessors and the number of storage areas for the dump processing executed by the microprocessors, by associating them with each other;
selects one of the microprocessors for a maximum number of storage areas for the dump processing to be executed as a microprocessor which is a transfer source of the ownership and selects another microprocessor for a minimum number of storage areas for the dump processing to be executed as a microprocessor which is a transfer destination of the ownership;
selects the microprocessor whose operating ratio is high or the microprocessor whose average response time is low, as the microprocessor which is the transfer source of the ownership when the microprocessor for the maximum number of storage areas for the dump processing to be executed exists in plurality; and
selects the microprocessor whose operating ratio is low or the microprocessor whose average response time is high, as the microprocessor which is the transfer destination of the ownership when the microprocessor for the minimum number of storage areas for the dump processing to be executed exists in plurality.

* * * * *